United States Patent [19]

Margrave

[11] Patent Number: 4,552,170

[45] Date of Patent: Nov. 12, 1985

[54] LINE INSERTABLE VALVE

[76] Inventor: David L. Margrave, 928 Buena Vista, South Pasadena, Calif. 91030

[21] Appl. No.: 650,822

[22] Filed: Sep. 14, 1984

[51] Int. Cl.[4] ............................................. F16K 43/00
[52] U.S. Cl. .............................. 137/318; 29/157.1 R; 29/213 E; 138/94; 138/97
[58] Field of Search ................. 137/15, 315, 318, 321; 138/93, 94, 94.3, 89, 97; 29/157.1 R, 213

[56] References Cited

U.S. PATENT DOCUMENTS

| 2,763,282 | 9/1956 | Reedy et al. | 137/318 |
|---|---|---|---|
| 2,780,244 | 2/1957 | Lee | 138/94 |
| 2,899,983 | 8/1959 | Farris | 137/318 |
| 3,532,113 | 10/1970 | McKean | 137/318 |
| 3,799,182 | 3/1974 | Long | 137/318 |
| 3,833,020 | 9/1974 | Smith | 137/318 |
| 3,863,667 | 2/1975 | Ward | 137/318 |
| 3,867,964 | 2/1975 | Gardner | 137/318 |
| 3,948,282 | 4/1976 | Yano | 137/318 |
| 4,127,141 | 11/1978 | Ledonne et al. | 138/94 |
| 4,205,697 | 6/1980 | Gebelius | 137/318 |

*Primary Examiner*—George L. Walton
*Attorney, Agent, or Firm*—Christie, Parker & Hale

[57] ABSTRACT

A valve which can be inserted in an existing pipe or similar line without disconnection of the line. The valve is separable into two halves which are clamped around the line. The valve handle is then rotated to drive a cutter through the line, and to position an expandable seal across the line bore. Flow through the pipe is thus terminated to enable downstream repairs or installation of new equipment. Retraction of the seal and cutter opens the valve to reinitiate fluid flow, and the valve can thereafter be used as a conventional shutoff valve, as well as providing an auxiliary "T" connection to the line if desired.

15 Claims, 4 Drawing Figures

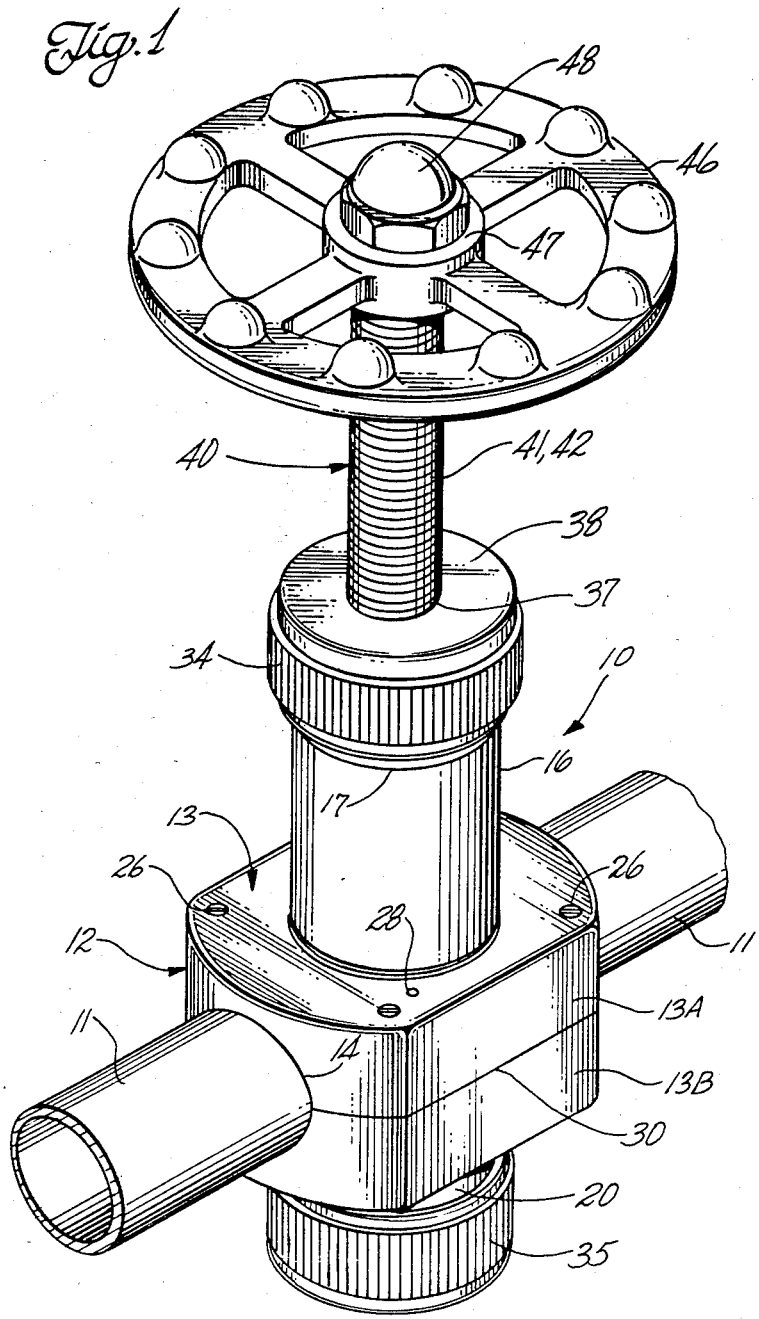

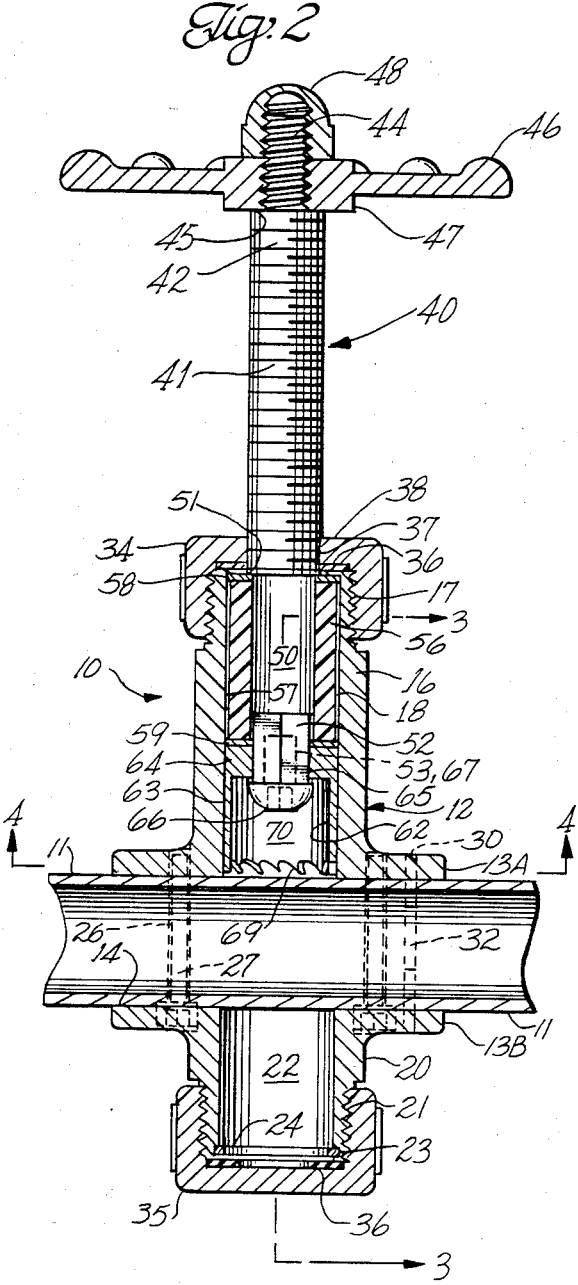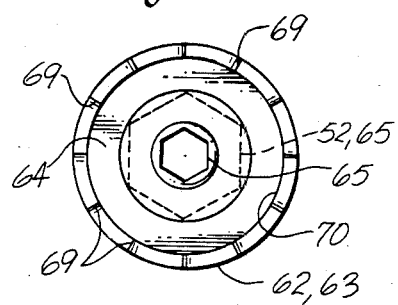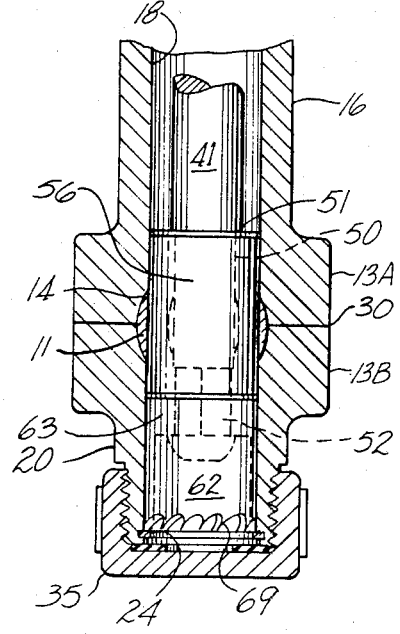

LINE INSERTABLE VALVE

BACKGROUND OF THE INVENTION

There are many situations in fluid-flow systems (gas or liquid) where an equipment malfunction or other problem requires temporary termination of flow through a pipe, tube, or similar metal or plastic line conduit. For example, a simple repair of a leaking valve or other plumbing fixture requires shutdown and depressurization of an entire water system until the repair is completed. Similar problems are encountered in refrigeration and air-conditioning systems which typically have fluid lines, and which need periodic maintenance and repair.

Short-term shutdown of a water or other system is usually not a major problem in a household setting, but can result in an economically serious interruption of normal activities in an office building, factory, or other large-scale installation. Shutdown of air conditioning in an otherwise unventillated building, for example, will quickly make the building uninhabitable, and major work may require the shutdown to continue for hours or even days.

Most fluid-system repairs or modifications require shutdown of only a small portion of the overall system, but adequate valving is typically not provided in the original installation to permit valving off of a small segment of the system. The line-insertable valve of this invention solves the problem by providing a multifunction line-cutting, valving, and T-connection assembly which can be fitted over an intact line and left permanently in place. Installation of the valve enables shutdown of only the typically small portion of the fluid-flow system requiring attention, while the remainder of the system continues in normal operation.

SUMMARY OF THE INVENTION

The line-insertable valve of this invention includes a body having an opening therethrough, the opening being dimensioned to receive the line so the body makes a snug sealed fit over the line. Preferably the body is formed in mating halves which can be separated, fitted over the line, and reconnected to fit tightly on the line. A tubular extension of the body defines an internal bore which extends to the pipe opening, and a portion of the body opposite the extension defines a receiving chamber which is aligned with the bore. Closures are provided on the body to seal the outer ends of the bore and receiving chamber.

A cutter-and-seal assembly is fitted within the body bore, and includes a shaft which extends through the bore closure. Preferably, the shaft is in threaded engagement with the bore closure, and a handle is provided at the shaft outer end, enabling the shaft to be advanced and retracted in the bore by rotation of the handle. A cutter, which is preferably in the form of a hollow sleeve, is secured to the inner end of the shaft to cut through the line when the shaft is advanced. Material cut from the line is captured within the cutter and carried into the receiving chamber where it can be removed after removal of the receiving-chamber closure.

A resilient and preferably expandable tubular seal is supported on the shaft between the cutter and bore closure to fit into and seal against the cut surfaces of the line when the shaft is fully extended. A stop is preferably provided in the receiving chamber to resist further extension movement of the cutter, and thereby to apply an expanding force to the seal.

In the fully extended position of the shaft, the line is valved off by the seal, and downstream repairs or modifications can be made while fluid flow is terminated. The line is opened to restore normal flow by retracting the shaft, seal and cutter back into the body tubular extension, and the valve is left in place to serve a normal shutoff function if needed in the future. It desired, the receiving-chamber closure can be removed to provide a "T" connection into the original line.

BRIEF DESCRIPTION OF THE DRAWINGS

FIG. 1 is a pictorial view of a line-insertable valve assembly as mounted on a fluid line according to the invention;

FIG. 2 is a side sectional elevation of the valve assembly showing a shaft assembly in a retracted position;

FIG. 3 is an end sectional elevation on line 3—3 of FIG. 2 showing the shaft assembly in a fully extended position; and FIG. 4 is an end view of a cutter on line 4—4 of FIG. 2.

DESCRIPTION OF THE PREFERRED EMBODIMENT

A valve assembly 10 of this invention is shown in FIG. 1 mounted on a water or refrigerant pipe or similar line 11 where fluid flow through a downstream line end 12 is to be at least temporarily terminated. The valve assembly includes two major subassemblies, the first of which is a body 12.

Referring to FIGS. 1-3, body 12 has line-housing boss 13 with an elongated cylindrical opening 14 extending longitudinally therethrough. Opening 14 is dimensioned to receive the outer surface of line 11 so the valve body makes a snug sealed fit over the line.

A tubular extension 16 projects upwardly (as viewed in the drawings) from the central part of the top of boss 13, and external threads 17 are formed at the upper end of the extension. A cylindrical bore 18 extends axially through extension 16 into opening 14, and the central axis of bore 18 intersects and is preferably perpendicular to the central axis of opening 14. The diameter of bore 18 is smaller than that of opening 14, and is preferably equal to or slightly larger than the inside diameter of line 11.

A second relatively short tubular extension 20 projects downwardly from the central underside of boss 13, and external standard pipe threads 21 are formed at the lower end of this extension. Tubular extension 20 is hollow to define a receiving chamber 22 which preferably is an extension of bore 18 in the upper body. That is, chamber 22 is preferably a cylindrical bore which is coaxial with and equal in diameter to bore 18. An annular groove 23 is formed in the inner wall of lower extension 20 slightly above the bottom of the receiving chamber, and a hardened-steel snap ring 24 is fitted into groove to extend into and narrow the diameter of the receiving chamber.

Preferably, body 12 is initially formed as a metal casting, and the several bores and threads are machined on the casting. Four countersunk bores 26 are then formed vertically through the respective corners of boss 13, and the upper ends of bores 26 are threaded to receive enlarged-head screws 27. A dowel-pin bore 28 is also machined through the boss parallel to bores 26.

Boss 13 is then (prior to installation of screws 27) cut in two along a plane 30 (which contains the axis of line opening 14, and is preferably perpendicular to the axis of bore 18) to split the boss into an upper portion 13A and a lower portion 13B. Splitting of the boss is done to enable the boss to be separated so portions 13A and 13B can be fitted over line 11, and then clamped to the line by tightening screws 27. Line opening 14 is reamed to true concentricity when the boss halves are reassembled after the parting operation, and an aligning dowel pin 32 is press fitted into bore 28 in boss portion 13B. Bore 28 in upper boss portion 13A is very slightly enlarged to make a snug slip fit with the dowel pin which assures perfect alignment of the reassembled boss halves.

The body subassembly is completed by an upper cap 34 and a lower cap 35 which are internally threaded to mate with threads 17 and 21 respectively to close the upper end of bore 18 and the lower end of receiving chamber 22. A conventional elastomeric seal 36 (a 50shore Neoprene material is satisfactory) is fitted in the base of each cap to prevent fluid leakage. A central threaded opening 37 is formed through a top wall 38 of the upper cap only.

A second major subassembly 40 of valve assembly 10 includes a shaft, cutter, and seal which are the main moving elements of the valve. A shaft 41 is cylindrical along most of its length, and a major part of the shaft defines external threads 42 which mate with the internal threads in opening 37 through upper cap 34. To provide the necessary mechanical advantage needed to enable manual severing of line 11, threads 42 are preferably quite fine, about 40 threads per inch being a satisfactory compromise between the desired mechanical advantage and a reasonable shaft advance speed.

An upper or outer end 44 of the shaft is reduced in diameter to define an annular shoulder 45. A valve operating handle or handwheel 46 has a central hub 47 which is threaded onto shaft end 44 to seat on shoulder 45. The handwheel is locked in place by a cap nut 48 which is preferably hexagonal so the shaft can be driven by a drill motor or socket-wrench fittings if desired.

An intermediate seal-supporting portion 50 of shaft 41 is reduced in diameter beneath threaded portion 42 to define an annular shoulder 51, and portion 50 has a smooth outer surface and is cylindrical in cross section. A lower or inner shaft end 52 beneath portion 50 is noncircular (e.g., hexagonal) in cross section, and an internally threaded blind bore 53 extends centrally within shaft end 52 toward portion 50.

A tubular elastomeric line seal 56 makes a slip fit over seal-supporting portion 50 of the shaft, and the seal has a cylindrical outer surface 57 which makes a slip fit within bore 18 of the valve body. Upper and lower metal washers 58 and 59 are fitted at opposite ends of seal 56, and the upper washer rests against shoulder 51 to limit upward movement of the seal on the shaft. Lower washer 59 and the lowr end of seal 56 extend slightly below shaft portion 50 to surround shaft end 52 when the seal is in a relaxed or uncompressed condition.

Seal 56 is preferably a substantially incompressible (in a bulk sense) polymer, and a polyurethane material of about 90-shore hardness (as available from duPont under the trademark Adiprene) is suitable. The objective is to provide a seal which will deflect radially outwardly in response to axially compressive forces applied to the seal ends.

A hollow caplike hardened-steel cutter 62 has a cylindrical outer suface 63 which makes a slip fit within bore 18 of the valve body, the outside diameter of the cutter being substantially equal to the outside diameter of unstressed seal 56. The upper end of the cutter has an end wall 64 with a noncircular opening 65 therethrough to receive inner shaft end 52. Axially downward movement of the cutter off shaft end 52 is prevented by an enlarged head 66 of a screw 67 threaded into bore 53 of the shaft end.

As shown in FIG. 2, the bottom of cutter end wall 64 is positioned slightly above the lower end of inner shaft end 52 to provide a small amount of axial freedom for the cutter and unstressed seal on the shaft. The cutter is locked against rotation with respect to the shaft by the mating noncircular shapes of shaft end 52 and end-wall opening 65. A number of cutting teeth 69 are formed in the lower end of the cutter, and the hollow interior of the cutter below end wall 64 defines a line-cutting receiving space 70.

The materials used to make the valve components are conventional, and are selected to prevent corrosion when exposed to the fluid carried by line 11. Brass is normally suitable for the valve body and caps 34 and 35, and type 303 stainless steel is suitable for the other metal parts which are exposed to the line fluid.

The dimensions of valve assembly are determined by the diameter of line 11 into which the valve is to be inserted. Line opening 14 of the valve body is thus given a diameter which provides a snug sealing fit of upper and lower body-boss halves 13A and 13B over the outer surface of the line. Similarly, the diameters of bore 18, unstressed seal 56, and cutter 62 are approximately equal to the inside diameter of the line. Most line sizes are accommodated by providing the valve assembly in sizes to mate with (for example) lines in the usual one-eighth or one-fourth inch increments from three-eights inch to six inches in outside diameter.

In use, handle 46 is rotated until shaft 41 is sufficiently retracted to position cutter 62 entirely within bore 18 of the valve body above line opening 14. The surface of line 11 is then cleaned, and preferably a conventional viscous silicone sealant material (not shown) is applied to the line surface where the valve assembly is to be installed (alternatively, O-rings or other seal styles may be provided). Screws 27 are then removed to separate upper and lower portions 13A and 13B of the valve body which are then fitted together over the line as shown in the drawings. Screws 27 are then reinserted and firmly tightened to clamp portions 13A and 13B in tight sealed engagement with the line.

Handle 46 is then rotated to drive the cutter into the line. The cutter is both rotated and advanced by rotation of the handle and shaft 41 to cut through the line. Material cut from the line is captured within space 70 of the cutter which continues to be advanced until teeth 69 bottom on the stop means provided by hardened snap ring 24 in receiving chamber 22. Continued advancing rotation of the handle and shaft then drives upper end wall 64 of the cutter against the underside of tubular seal 56 which is now positioned within the cut portion of the line as shown in FIG. 3. The resulting axial compression of the seal causes it to expand radially into tight sealing contact with the line, and flow through the line is terminated. In a preferred form, shaft 41 is dimensioned to bottom the undersurface of handle hub 47 against the top of upper cap 34 when the seal is fully expanded, thereby providing a positive stop to signal the user that further advancing rotation of the shaft is unnecessary.

With the cutter in a fully extended position which radially expands the seal, lower cap 35 is unthreaded from the bottom of the valve body to permit removal of chips and severed portions of the line from receiving chamber 22 and space 70 within the cutter. The lower cap is then reinstalled, and any necessary downstream repairs or modifications of the line are completed which fluid flow is shut off. When this work is completed, handle 46 is rotated to retract the shaft, seal, and cutter back into bore 18 of the upper valve body, and normal full-port fluid flow is again established. The slight axial freedom provided for the cutter and seal on shaft 41 insures that the seal will fully contract to clear the cut portion of the line without interference as the shaft is retracted.

Once installed, the valve assembly is left permanently in place on the line, and can be used as a shutoff valve as desired. Importantly, lower tubular extension 20 of the valve body is in communication with the interior of the line, enabling a "T" connection into the line as is sometimes needed in the modification of fluid-flow systems. The auxiliary T-connected line (not shown) can be threaded directly on threads 21 of the lower tubular extension, or adapters accommodating different line diameters or thread sizes can be inserted between the lower tubular extension and the auxiliary line.

There has been described a valve assembly which is insertable in an unbroken fluid-flow line by a quick and simple installation procedure. By use of a cutter which is smaller than the line outside diameter, the line is not completely severed apart, and opposed sidewall portions of the line remain intact. These sidewall portions maintain the strength of the line to axial forces, and the clamping action of the valve body on the line also prevents any compromise of line strength against axial, torsional, or bending forces. Once in place, the valve assembly provides reliable and repeatable shutoff of fluid flow in the line, as well as providing a convenient connection point for an auxiliary T-inserted line.

What is claimed is:

1. A valve for insertion in an elongated fluid line, comprising:
    a valve body having an opening therethrough to receive the line, the body being configured for fitting over and being sealingly attached to the line, the body defining a bore extending laterally from one side of the line opening, and a receiving chamber extending laterally from the line opening and diametrically opposed to the bore, the body including first and second closures secured thereto to close the bore and receiving chamber respectively;
    a shaft extending through the first closure into the bore;
    means on the shaft for rotatably advancing the shaft through the first closure toward the receiving chamber;
    a cutter secured to an inner end of the shaft and configured to cut rotatably through at least a portion of the line as the shaft is advanced; and
    seal means positioned on the shaft between the cutter and first closure to be advanced into and seal against the cut portion of the line by continued advancement of the shaft when the cutter has passed through the line into the receiving chamber when the seal means or the cutter engages a stop means, thereby sealing the line from the receiving chamber.

2. The assembly defined in claim 1 wherein the cutter is hollow to receive material cut from the line, and the second closure is removable from the valve body to enable removal of such material from the cutter.

3. The assembly defined in claim 2 wherein the cutter has an outside diameter smaller than an outside diameter of the line.

4. The assembly defined in claim 1 wherein the seal means is an expandable elastomeric annular seal.

5. The assembly defined in claim 4 and further comprising a stop means in the receiving chamber for blocking further advancing movement of the cutter after the cutter has passed through the line to position the seal within the line.

6. The assembly defined in claim 5 wherein the cutter is locked to the shaft to prevent relative rotation therebetween without preventing relative axial movement between the cutter and shaft, whereby the cutter compresses the seal into engagement with the line when the cutter is bottomed on the stop means and the shaft is further advanced.

7. A valve for insertion in an elongated fluid line, comprising:
    a split valve body having first and second portions defining therebetween a line opening configured to receive and sealingly fit over the line, the body including means for clamping the first and second portions together over the line, the first body portion having a bore therethrough extending into the line opening;
    a shaft rotatably mounted on the first body portion for advancing and retracting movement of an inner end of the shaft within the bore and line opening;
    a cutter secured to the shaft inner end to rotate therewith while having at least limited axial freedom with respect to the shaft; and
    an expandable annular elastomeric seal positioned on the shaft adjacent the cutter to be axially compressed by axial movement of the cutter by continued advancement of the shaft after penetration of the line by the cutter positions the seal in the line, such axial compression causing the seal to expand radially against and thereby fully seal the line when the cutter engages a stop means.

8. The assembly defined in claim 7 wherein the second body portion defines a receiving chamber diametrically opposed to the bore and extending into the line opening, the receiving chamber being configured to accommodate the cutter after it has passed through the line to position the seal within the line.

9. The assembly defined in claim 8 wherein the second body portion further includes a closure releasably secured over the receiving chamber, removal of the closure enabling removal of material severed from the line by the cutter.

10. The assembly defined in claim 9 wherein the second body portion defines a threaded portion to receive the closure, and alternatively to accept an auxiliary line to be T-connected into the line on which the valve is mounted.

11. The assembly defined in claim 8 wherein the shaft has a portion with a noncircular cross section in engagement with a portion of the cutter having a mating noncircular cross section.

12. The assembly defined in claim 11 wherein the shaft includes a fastener secured to the shaft inner end to retain the cutter while permitting at least limited axial movement between the cutter and shaft.

13. The assembly defined in claim 12 wherein the shaft defines a shoulder within the bore, and the seal seats on the shoulder to prevent seal movement toward an outer end of the shaft, the seal being positioned between the cutter and shoulder.

14. The assembly defined in claim 13, and further comprising a stop means in the receiving chamber for resisting further advancing movement of the cutter after the cutter has passed through the line to position the seal within the line, whereby continued advancing movement of the shaft causes the seal to expand radially into sealed contact with the line.

15. The assembly defined in claim 14 wherein the cutter has a hollow interior to receive material severed from the line, the cutter and seal being generally cylindrical with external diameters smaller than the diameter of the line opening.

* * * * *